(12) United States Patent
Johansson et al.

(10) Patent No.: US 10,425,948 B2
(45) Date of Patent: Sep. 24, 2019

(54) ASSIGNING RESOURCES FOR CONTROL SIGNALLING FOR A WIRELESS DEVICE

(71) Applicant: Telefonaktiebolaget LM Ericsson (publ), Stockholm (SE)

(72) Inventors: Anders Johansson, Hässelby (SE); Ying Sun, Sundbyberg (SE); Karl D. Mann, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/755,830

(22) PCT Filed: Nov. 20, 2015

(86) PCT No.: PCT/SE2015/051253
§ 371 (c)(1),
(2) Date: Feb. 27, 2018

(87) PCT Pub. No.: WO2017/086852
PCT Pub. Date: May 26, 2017

(65) Prior Publication Data
US 2018/0332590 A1 Nov. 15, 2018

(51) Int. Cl.
*H04W 72/04* (2009.01)
*H04L 5/00* (2006.01)

(52) U.S. Cl.
CPC ....... *H04W 72/0486* (2013.01); *H04L 5/0007* (2013.01); *H04L 5/0048* (2013.01); *H04W 72/042* (2013.01); *H04W 72/044* (2013.01)

(58) Field of Classification Search
CPC ........... H04W 72/0486; H04W 72/042; H04W 72/044; H04L 5/0007; H04L 5/0048
See application file for complete search history.

(56) References Cited

U.S. PATENT DOCUMENTS

2011/0007700 A1* 1/2011 Aminaka .......... H04W 72/0406
370/329
2012/0063413 A1* 3/2012 Kroener ................ H04W 72/12
370/330

(Continued)

FOREIGN PATENT DOCUMENTS

JP 2014096658 A 5/2014
WO 2013117014 A1 8/2013

OTHER PUBLICATIONS

NEC Group, "R1-123252: PRB indication to UE for ePDCCH transmission," Third Generation Partnership Project (3GPP), TSG RAN WG1 Meeting #70, Aug. 13-17, 2012, 12 pages, Qingdao, China.

(Continued)

Primary Examiner — Ajay Cattungal
(74) Attorney, Agent, or Firm — Withrow & Terranova, PLLC

(57) ABSTRACT

Assigning resources for control signalling for a wireless device is described wherein the resources can be used for user data when not used for control signalling. A network node obtains a collection of at least one configuration group, wherein each configuration group refers to a selection of the resources; determines a load for each one of the configuration groups; when no configuration group of the collection has a load which is less than a first threshold value, instantiates a new configuration group referring to a selection of the resources, and assigns at least part of the resources of the new configuration group to the wireless device; and when there is a first configuration group in the collection having a load which is less than the first threshold value, assigns at least part of the resources of the first configuration group to the wireless device.

18 Claims, 6 Drawing Sheets

(56) References Cited

U.S. PATENT DOCUMENTS

| | | | | |
|---|---|---|---|---|
| 2014/0119314 A1* | 5/2014 | Pajukoski | ............. | H04L 5/0051 370/329 |
| 2014/0301228 A1* | 10/2014 | Kwak | ................... | H04W 76/14 370/252 |
| 2015/0071201 A1* | 3/2015 | Larsson | ................. | H04L 5/001 370/329 |
| 2015/0181588 A1* | 6/2015 | Song | .................... | H04L 1/1607 370/280 |
| 2015/0304994 A1* | 10/2015 | Kim | ..................... | H04L 5/0048 370/280 |
| 2015/0358962 A1* | 12/2015 | Lee | .................. | H04W 72/0446 370/336 |
| 2016/0081107 A1* | 3/2016 | Yang | ....................... | H04L 5/001 370/280 |
| 2016/0174057 A1* | 6/2016 | Oh | ........................ | H04W 8/005 455/434 |
| 2016/0353323 A1* | 12/2016 | Sun | ....................... | H04W 84/12 |

OTHER PUBLICATIONS

International Search Report and Written Opinion for International Patent Application No. PCT/SE2015/051253, dated Jul. 20, 2016, 10 pages.

* cited by examiner

ASSIGNING RESOURCES FOR CONTROL SIGNALLING FOR A WIRELESS DEVICE

This application is a 35 U.S.C. § 371 national phase filing of International Application No. PCT/SE2015/051253, filed Nov. 20, 2015, the disclosure of which is incorporated herein by reference in its entirety.

TECHNICAL FIELD

The invention relates to a method, network node, computer program and computer program product for allocating space for assigning resources for control signalling for a wireless device.

BACKGROUND

Cellular communication networks evolve towards higher data rates, improved capacity and improved coverage. In the 3rd Generation Partnership Project (3GPP) standardization body, several technologies have been and are also currently being developed.

LTE (Long Term Evolution) is a recently standardised technology. It uses an access technology based on OFDM (Orthogonal Frequency Division Multiplexing) for the downlink (DL) and Single Carrier FDMA (SC-FDMA) for the uplink (UL). The resource allocation to wireless devices on both DL and UL is performed adaptively using the concept of fast scheduling, taking into account the instantaneous traffic pattern and radio propagation characteristics of each wireless device. Assigning resources in both DL and UL is performed in the scheduler situated in a radio network node such as the radio base station.

In LTE Rel-11, a new downlink control channel, EPD-CCH (Enhanced Physical Downlink Control Channel), was added to the standard. This channel can be used to transmit wireless device specific scheduling assignments for wireless devices that are EPDCCH capable. The EPDCCH channel is multiplexed with the physical downlink shared channel, PDSCH, in the shared data region. There are several use cases for EPDCCH such as increased control channel capacity, control channel ICIC (Inter-Cell Interference Coordination) support for HetNet and Combined Cell, and control channel beamforming.

Since PDSCH and EPDCCH are multiplexed in the same shared region, it is a great challenge to find a suitable balance of resource usage between PDSCH and EPDCCH.

SUMMARY

According to a first aspect, it is provided a method for assigning resources for control signalling for a wireless device, wherein the resources can be used for user data when not used for control signalling. The method is performed in a network node and comprises the steps of: obtaining a collection of at least one configuration group, wherein each configuration group refers to a selection of the resources; determining a load for each one of the configuration groups; when no configuration group of the collection has a load which is less than a first threshold value, instantiating a new configuration group referring to a selection of the resources, and assigning at least part of the resources of the new configuration group to the wireless device; and when there is a first configuration group in the collection having a load which is less than the first threshold value, assigning at least part of the resources of the first configuration group to the wireless device.

Each resource may be a pair of physical resource blocks, PRBs.

Each configuration group may comprise at least one Enhanced Physical Downlink Control Channel, EPDCCH, set, wherein each EPDCCH set comprises at least two resources.

The method may further comprise the steps of: determining a load for each EPDCCH set of the configuration group assigned to the wireless device; and when there is a first EPDCCH set whose resources are currently unassigned to any wireless devices and a second EPDCCH set whose resources are assigned to at least one wireless device and the load for the second EPDCCH set is less than a second threshold value, assigning a control message in the second EPDCCH set to be sent to the wireless device.

The method may further comprise the step of: when there is a first EPDCCH set whose resources are currently unassigned to any wireless devices and a second EPDCCH set whose resources are assigned to at least one wireless device and the load for the second EPDCCH set is greater than a second threshold value, assigning a control message in the first EPDCCH set to be sent to the wireless device.

There may be at least one EPDCCH set which is assigned to two configuration groups.

The method may further comprise the steps of: when the EPDCCH set is of a localized type, searching the resources for each wireless device in the same order for free Enhanced Control Channel Elements, ECCEs; and assigning a control message to free ECCEs.

The method may further comprise the step of: when there is spare capacity in one configuration group, consolidating wireless device assignments by assigning at least part of the resources of the configuration group with spare capacity to at least one wireless device to which resources of another configuration group was previously assigned.

According to a second aspect, it is provided a network node for assigning resources for control signalling for a wireless device, wherein the resources can be used for user data when not used for control signalling. The network node comprises: a processor; and a memory storing instructions that, when executed by the processor, cause the network node to: obtain a collection of at least one configuration group, wherein each configuration group refers to a selection of the resources; determine a load for each one of the configuration groups; when no configuration group of the collection has a load which is less than a first threshold value, instantiate a new configuration group referring to a selection of the resources, and assign at least part of the resources of the new configuration group to the wireless device; and when there is a first configuration group in the collection having a load which is less than the first threshold value, assign at least part of the resources of the first configuration group to the wireless device.

Each resource may be a pair of physical resource blocks, PRBs.

Each configuration group may comprise at least one Enhanced Physical Downlink Control Channel, EPDCCH, set, wherein each EPDCCH set comprises at least two resources.

The network node may further comprise instructions that, when executed by the processor, cause the network node to: determine a load for each EPDCCH set of the configuration group assigned to the wireless device; and when there is a first EPDCCH set whose resources are currently unassigned to any wireless devices and a second EPDCCH whose resources are assigned to at least one wireless device and the load for the second EPDCCH set is less than a second threshold value, assign a control message in the second EPDCCH set to be sent to the wireless device.

The network node may further comprise instructions that, when executed by the processor, cause the network node to: when there is a first EPDCCH set whose resources are currently unassigned to any wireless devices and a second EPDCCH set whose resources are assigned to at least one wireless device and the load for the second EPDCCH set is greater than a second threshold value, assign a control message in the first EPDCCH set to be sent to the wireless device.

There may be at least one EPDCCH set which is assigned to two configuration groups.

The network node may further comprise instructions that, when executed by the processor, cause the network node to, when the EPDCCH set is of a localized type, search the resources for each wireless device in the same order for free Enhanced Control Channel Elements, ECCEs; and assign a control message to free ECCEs.

The network node may further comprise instructions that, when executed by the processor, cause the network node to: when there is spare capacity in one configuration group, consolidate wireless device assignments by assigning at least part of the resources of the configuration group with spare capacity to at least one wireless device to which resources of another configuration group was previously assigned.

According to a third aspect, it is provided a network node comprising: means for obtaining a collection of at least one configuration group, wherein each configuration group refers to a selection of resources for control signalling for a wireless device, wherein the resources can be used for user data when not used for control signalling; means for determining a load for each one of the configuration groups; means for instantiating a new configuration group referring to a selection of the resources when no configuration group of the collection has a load which is less than a first threshold value; means for assigning at least part of the resources of the new configuration group to the wireless device when no configuration group of the collection has a load which is less than a first threshold value; and means for assigning at least part of the resources of the first configuration group to the wireless device when there is a first configuration group in the collection having a load which is less than the first threshold value.

According to a fourth aspect, it is provided a computer program for assigning resources for control signalling for a wireless device, wherein the resources can be used for user data when not used for control signalling. The computer program comprises computer program code which, when run on a network node causes the network node to: obtain a collection of at least one configuration group, wherein each configuration group refers to a selection of the resources; determine a load for each one of the configuration groups; when no configuration group of the collection has a load which is less than a first threshold value, instantiate a new configuration group referring to a selection of the resources, and assign at least part of the resources of the new configuration group to the wireless device; and when there is a first configuration group in the collection having a load which is less than the first threshold value, assign at least part of the resources of the first configuration group to the wireless device.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
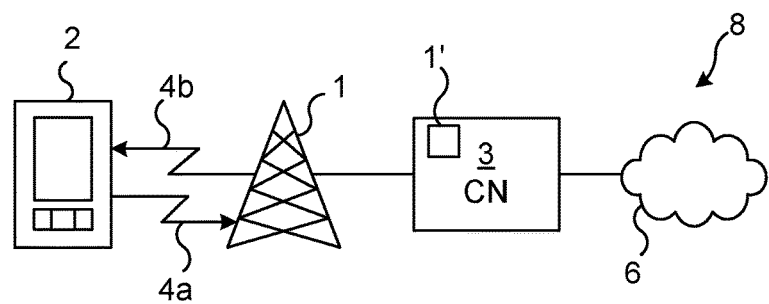
FIG. 1 is a schematic diagram illustrating an environment in which embodiments presented herein can be applied.

FIG. 1 is a schematic diagram illustrating a cellular network 8 where embodiments presented herein may be applied. The cellular network 8 comprises a core network 3 and one or more radio network nodes 1 such as radio base stations, e.g. in the form of evolved Node Bs, also known as eNode Bs or eNBs. The radio network node 1 could also be in the form of Node Bs, BTSs (Base Transceiver Stations) and/or BSSs (Base Station Subsystems), etc. The radio network node 1 provides radio connectivity to a plurality of wireless devices 2. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink (UL) communication 4a (from the wireless device 2 to the radio network node 1) and downlink (DL) communication 4b (from the radio network node 1 to the wireless device 2) occur over a wireless radio interface. The quality of the wireless radio interface to each wireless device 2 can vary over time and depends on the position of the wireless device 2, due to effects such as fading, multipath propagation, interference, etc.

The radio network node 1 is also connected to the core network 3 for connectivity to central functions and a wide area network 6, such as the Internet. Within the core network, there is a core network node 1' which can be used for assignment of resources for control signalling as described below.

In the description and claims herein, the phrase "network node" is to be interpreted as either one of a radio network node 1 or a core network node 1'.

Figure 2:
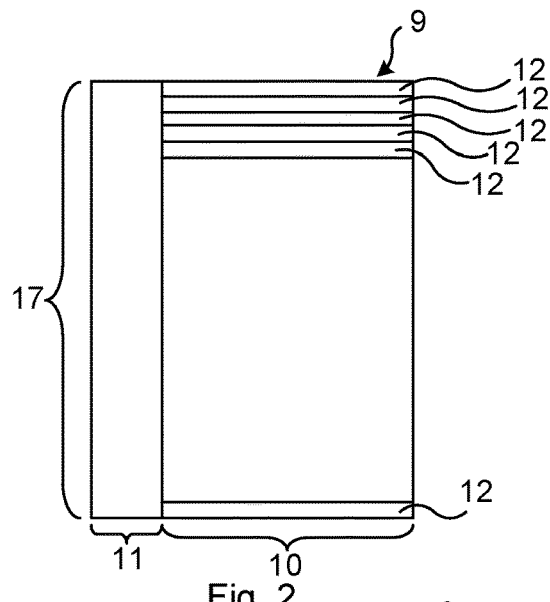
FIG. 2 is a schematic diagram illustrating a structure of a downlink subframe which can be used in the environment of FIG. 1.
Figure 3:
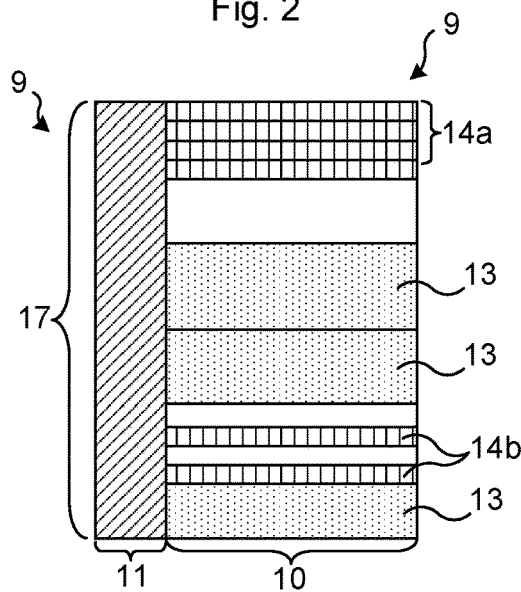
FIG. 3 is schematic diagram illustrating a structure of a downlink subframe where EPDCCH is utilised in the environment of FIG. 1.

FIG. 2 is a schematic diagram illustrating a structure of a downlink subframe 9 which can be used in the environment of FIG. 1. Time is here, as in FIG. 3, and FIGS. 4A-C, on a horizontal axis and frequency is on a vertical axis. In the downlink, transmissions are divided into subframes 9 of length 1 ms. Each subframe 9 is typically divided into 14 OFDM (Orthogonal Frequency Division Multiplexing) symbols. The first 1, 2, 3 or 4 OFDM symbols are used to transmit the downlink control channel Physical Downlink Control Channel (PDCCH) ii which carries information on scheduling assignments using DCI (Downlink Control Information) messages. These assignments contain information to the wireless devices on scheduling of data in both DL and UL. The remaining part 10 of the downlink subframe 9 is used for downlink user data on PDSCH (Physical Downlink Shared Channel) 13. This region 10 is divided into resources in the form of Physical Resource Block pairs 12 on the frequency axis.

The size of the control region 11 is indicated by a CFI (Control Format Indicator) value which is transmitted on PHICH (Physical HARQ Indicator Channel) in the first OFDM symbol of each subframe 9. The control region 11 is logically divided into CCEs (Control Channel Elements). A PDCCH then uses a number of these CCEs to transmit the DCI. How many CCEs to use depends on the amount of coding the radio network node decides is needed for the wireless device to decode the message with adequate error probability.

Since the wireless device does not know exactly where the PDCCHs directed to it are located within the control region, it is forced to do blind decoding to extract the message. To keep the number of blind decoding combination, and hence also the processing load, on a reasonable level, 3GPP has defined a number of rules that restricts the mapping of the PDCCH onto the CCE space. Some rules that are applicable in here are:

1. The only allocation sizes the wireless device shall evaluate are 1, 2, 4 and 8 contiguous CCEs. These sizes are hereafter referred to as "aggregation levels".

2. The wireless devices are only required to monitor a few alternatives on each aggregation level. These alternatives are referred to as "search space".

3. The wireless device shall only evaluate for PDCCH assignments for which the condition "startCCEindex % aggregationLevel==0" is true, where '%' is the mod operator, meaning that aggregation level 1 can start at any CCE index, aggregation level 2 can only start on even CCE indexes etc.

To avoid continuous blocking between the search spaces for two wireless devices, the candidates are changed with a pseudo-random scrambling based on wireless device identity and subframe number. Hence, the search space varies between wireless devices.

The total size of the CCE space, NCCEmax, depends on a number of factors such as system bandwidth, CFI, number of antenna ports, FDD/TDD (Frequency Division Duplex/Time Division Duplex) and normal/extended CP (Cyclic Prefix). Typical values for NCCEmax are around 20 to 50, and the lower and upper limits are 1 and 88, respectively. Looking now to FIG. 3, this illustrates a structure of a downlink subframe 9 where control signalling in the form of EPDCCH (Enhanced PDCCH) is utilised in the environment of FIG. 1. EPDCCH is a new downlink control channel added in LTE Rel-11. This channel can be used to transmit wireless device specific scheduling assignments for those wireless devices that are EPDCCH capable. In this example, the EPDCCH channel control signalling is transmitted in a first control signalling sections 14a and a second control signalling section 14b. Each control signalling section 14a-b is made up of two or more PRB (Physical Resource Block) pairs and the number of PRB pairs used can vary between control signalling sections. The PRB pairs belonging to each control signalling section can be placed anywhere in the frequency domain. For other PRB pairs, the downlink shared channel, PDSCH 13, is provided. There are several use cases for EPDCCH such as increased control channel capacity, control channel ICIC (Inter-Cell Interference Coordination) support for HetNet and Combined Cell, and control channel beamforming.

An EPDCCH capable wireless device can be configured to monitor EPDCCH for wireless device specific scheduling assignments in all subframes or only in some of the subframes. The wireless devices are semi-statically assigned EPDCCH resources using wireless device dedicated RRC (Radio Resource Control) signaling. Similar to PDCCH, there are also typically multiple EPDCCHs in each subframe and the wireless devices will be required to monitor the EPDCCHs to be able to detect the wireless device specific assignments directed to them and in that way being able to find the data directed to them. In the subframes where the wireless device monitors EPDCCH for wireless device specific assignment, the legacy PDCCH is only monitored for common DL scheduling assignments such as e.g. SIB (System Information Block), paging and Random Access messages.

The wireless device can be assigned to monitor one or two EPDCCH sets. An EPDCCH set consist of 2, 4 or 8 resources being PRB pairs. Similar to the division of the control region into a logical CCE space, an EPDCCH set is divided into a logical ECCE (Enhanced CCE) space. An EPDCCH set is then mapped onto a number of these ECCEs. The total number of available ECCEs in an EPDCCH set q, NECCEmax,q, depends on the number of PRB pairs in the set, normal or extended CP, and normal or special subframe, and in case of special subframe, which special subframe configuration. The range of values for NECCEmax is [4, 8, 16, 32]. Furthermore, similar to PDCCH, there are also rules that restrict the mapping of the EPDCCH onto the ECCE space. The three rules listed for PDCCH above are also applicable to EPDCCH, but with a minor difference that there are other aggregation levels available for EPDCCH; 1, 2, 4, 8, 16 and 32. Not all of these aggregation levels are available simultaneously; the available levels depend on the configuration of e.g. number of PRB pairs in the EPDCCH set and size of the DCI message.

Some differences between EPDCCH and PDCCH is that EPDCCH only is used for wireless device specific assignments and is multiplexed with PDSCH, while PDCCH can be used for both wireless device specific and common assignments and that PDCCH is located in the control region in the beginning of each subframe while EPDCCH is multiplexed with PDSCH. Furthermore, the EPDCCH sets are wireless device specific, although it is possible to overlap the sets allowing for multiplexing of several EPDCCHs on the same PRB pairs. Finally, the EPDCCH is more flexible than the PDCCH supporting e.g. dynamic capacity, beamforming and ICIC, which is not possible for PDCCH.

The EPDCCH sets can be configured in two different modes; Localized or Distributed. In the Localized mode, the EPDCCH is transmitted in as few PRB pairs as possible while for the Distributed mode the EPDCCH is transmitted on as many PRB pairs as possible.

Figure 4A:
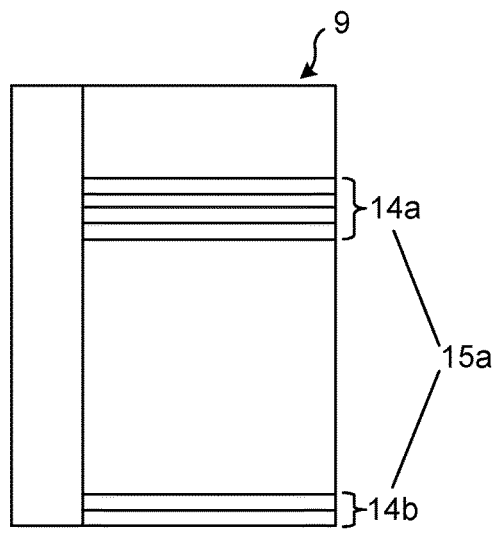
FIGS. 4A-C are schematic diagrams illustrating the use of configuration groups for assigning control signalling resources in the environment of FIG. 1.
Figure 4B:
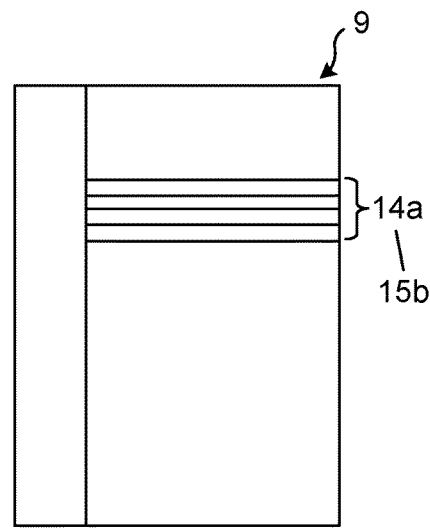
Figure 4C:
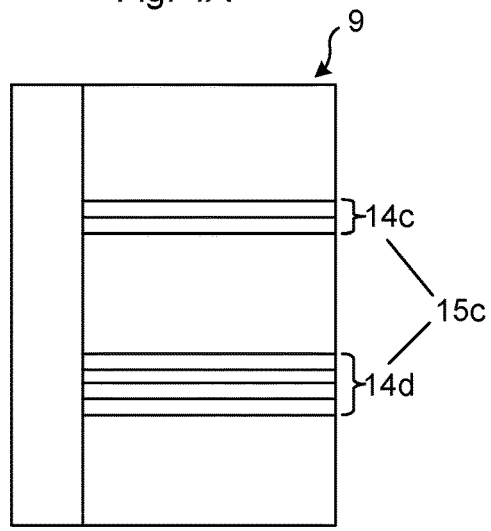

FIGS. 4A-C are schematic diagrams illustrating the use of configuration groups for assigning control signalling resources in the environment of FIG. 1. Each configuration group refers to one or more control signalling sections, where each control signalling section corresponds to a set of resources in the form of PRB pairs. By managing control signalling sections in configuration groups, a configuration group (or more specifically, the control signalling sections of a configuration group) can be used when balancing resource usage between EPDCCH and PDSCH, as explained in more detail below. In here, each control signalling section 14a-d can be an EPDCCH set, e.g. as defined by 3GPP.

Looking first to FIG. 4A, there is a first control signalling section 14a and a second control signalling section 14b. A first configuration group 15a consists of references to the first control signalling section 14a and the second control signalling section 14b.

In FIG. 4B, there is only the first control signalling section 14a. A second configuration group 15b consists of references only to the first control signalling section 14a.

In FIG. 4C, there is a third control signalling section 14c and a fourth control signalling section 14d. A third configuration group 15c consists of references to the third control signalling section 14c and the fourth control signalling section 14d.

It is to be noted that the configuration groups can co-exist at the same point in time for the same subframe. The division into three figures in FIGS. 4A-C is only for clarity of explanation. As seen in FIGS. 4A-B, the configuration groups may, but do not need to, overlap such that one control signalling section belongs to several configuration group. For instance, in the illustrated example, the first control signalling section 14a belongs to both the first configuration group 15a and the second configuration group 15b.

Figure 5A:
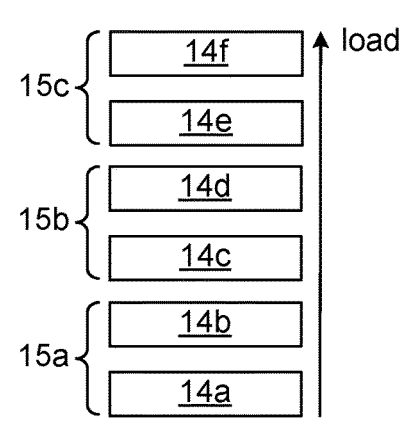
FIGS. 5A-B are schematic diagrams illustrating the relation between EPDCCH sets and configuration groups according to different embodiments.
Figure 5B:
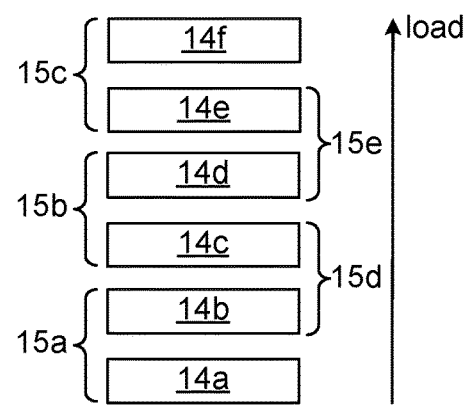

FIGS. 5A-B are schematic diagrams illustrating the relation between control signalling sections and configuration groups according to different embodiments.

In FIG. 5A, an embodiment is shown where the configuration groups do not overlap. Here, a first configuration group 15a consists of a first control signalling section 14a and a second control signalling section 14b; a second configuration group 15b consists of a third control signalling section 14c and a fourth control signalling section 14d; and a third configuration group 15c consists of a fifth control signalling section 14e and a sixth control signalling section 14f.

The load indicator indicates an order in which configuration groups and control signalling sections are assigned to wireless devices. By using such a predefined order, the usage of resources is packed, whereby any resources which could potentially be used for EPDCCH but are not currently assigned, can be used for PDSCH, thus increasing DL throughput.

In FIG. 5B, an embodiment is shown where the configuration groups overlap. The first, second and third configuration groups 15a-c are the same as in FIG. 5A. Here, however, there is also a fourth configuration group 15d consisting of the second control signalling section 14b and the third control signalling section 14c; and a fifth configuration group 15e consisting of the fourth control signalling section 14d and the fifth control signalling section 14e.

When overlapping configuration groups are used, then it is possible to alternate between localized and distributed sets if both types of EPDCCH sets are required.

Figure 6A:
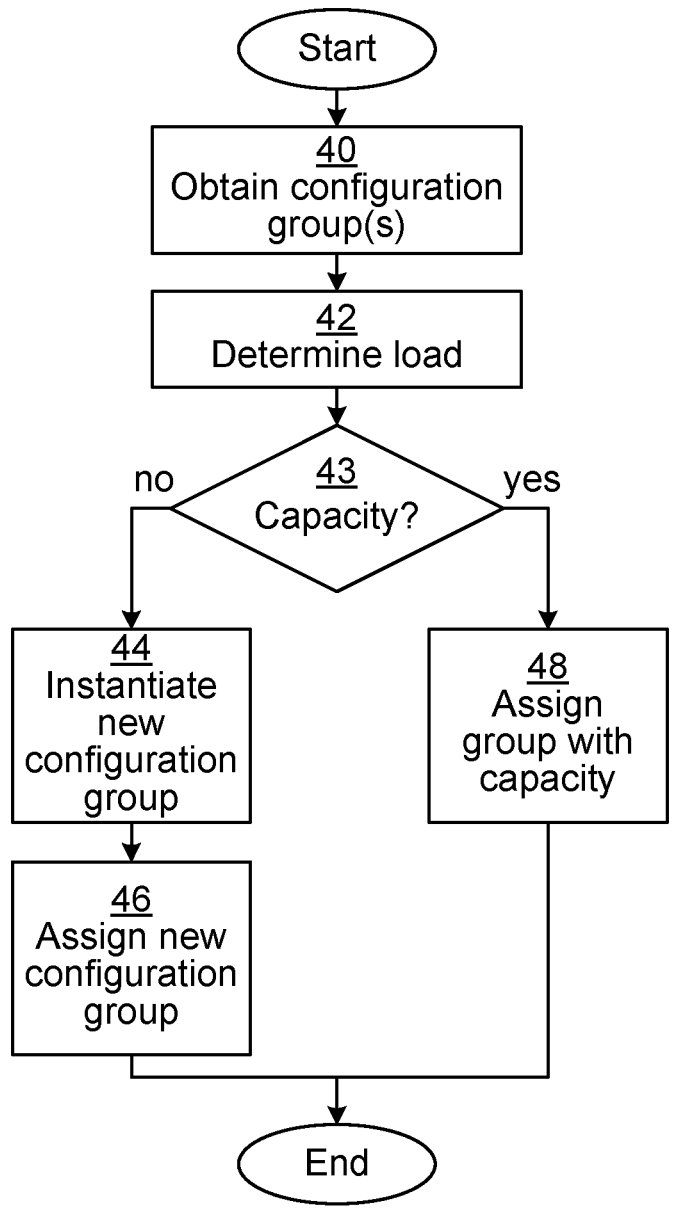
FIGS. 6A-C are flow charts illustrating methods for assigning resources for control signalling for a wireless device.
Figure 6B:
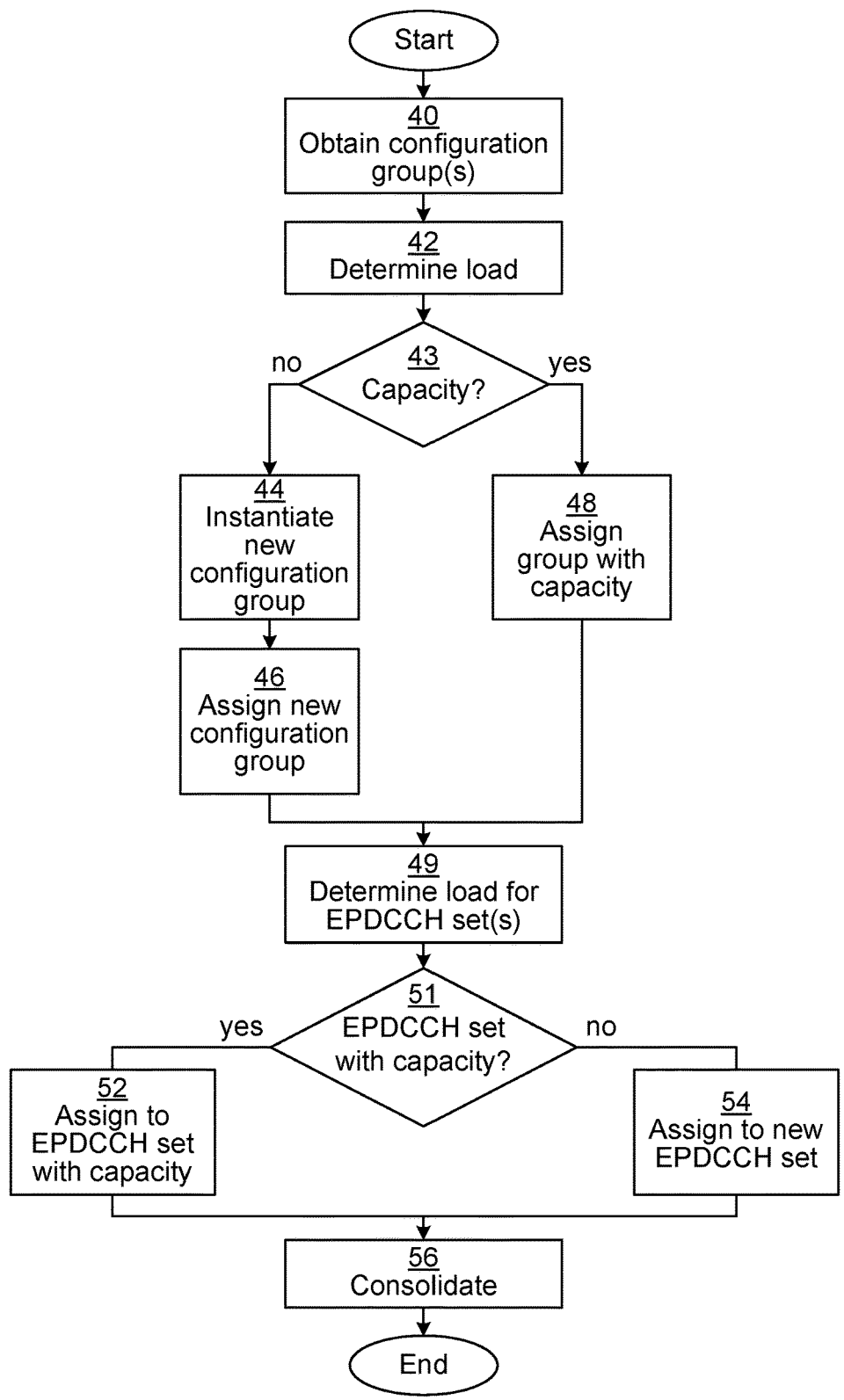
Figure 6C:
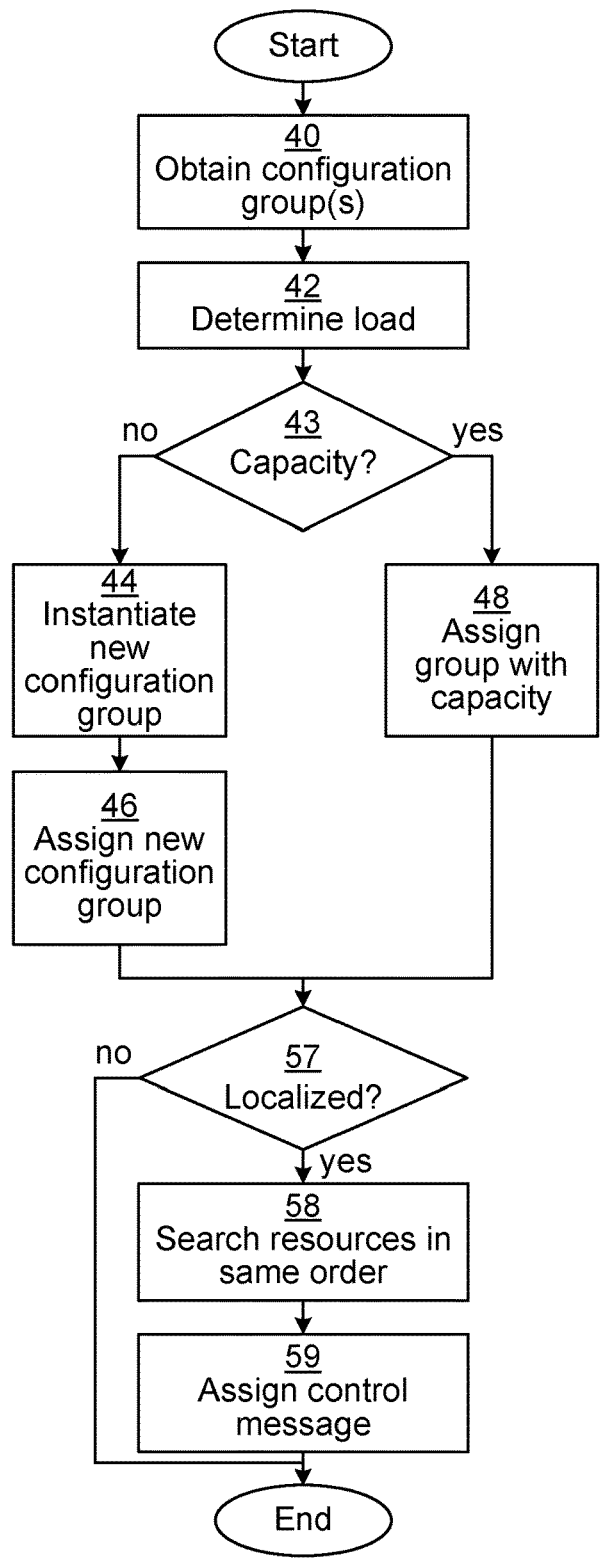

FIGS. 6A-C are flow charts illustrating methods for assigning resources for control signalling for a wireless device. As explained above, the resources can be used for user data when not used for control signalling. Each resource can e.g. be a pair of physical resource blocks, PRBs (12 of FIG. 2). The method is performed in any one of the network nodes 1, 1' of FIG. 1.

In an obtain configuration group(s) step 40, a collection of at least one configuration group is obtained, e.g. by reading from memory of the network node. The collection contains all instantiated configuration groups which can be used for control signalling for the wireless device, i.e. from the radio network node used for DL signalling to the wireless device. As explained above, each configuration group refers to a selection of the resources. Each configuration group consists of one or more control signalling sections in the form of EPDDCH sets. As explained above, each EPDCCH set comprises at least two resources. Optionally, there can be one or more EPDCCH sets which is assigned to two configuration groups, e.g. as illustrated in FIG. 5B and discussed above.

In a determine load step 42, a load for each one of the configuration groups is determined. The load could e.g. be obtained by measuring the EPDCCH utilization, the ECCE utilization, the EPDCCH blocking rate etc. Optionally, the corresponding measure on PDCCH could be used for an indication of load, since using PDCCH is an alternative to configuring EPDCCH resources for the wireless device.

In a conditional capacity step 43, it is determined whether there is at least one configuration group of the collection has a load which is less than a first threshold value.

The first threshold value is configured to define the maximum load at which an additional wireless device could be added and still not overloading the configuration group, i.e. the maximum load when there is still spare capacity. If this is the case, there is thus spare capacity and the method proceeds to an assign group with capacity step 48. If this is not the case, there is not sufficient capacity and the method proceeds to an instantiate new configuration group step 44.

In the instantiate new configuration group step 44, a new configuration group is instantiated. As for the other configuration groups, the new configuration group also refers to a selection of the resources. The new group is added to the collection of configuration groups.

In the assign new configuration group step 46, at least part of the resources of the new configuration group is assigned to the wireless device. In one embodiment, all EPDCCH sets of the new configuration group are assigned to the wireless device.

In the assign group with capacity step 48, at least part of the resources of the first configuration group is assigned to the wireless device. In one embodiment, all EPDCCH sets of the first configuration group are assigned to the wireless device. Optionally, when the EPDCCH set contains resources to be assigned to the wireless device which are of a localized type, the resources for each time this step is performed (for each wireless device) are searched in the same order for free ECCEs. This will make sure that the PRB pairs are filled up before a new PRB pair is taken for EPDCCH. Hence, the EPDCCH signalling is better packed, thereby allowing unused PRB pairs to be used for PDSCH.

Alternatively or additionally, when there are more than one EPDCCH sets defined in a configuration group, when searching for free ECCEs for a wireless device, the same one of the EPDCCH sets is used first for all wireless devices. Thereby the EPDCCH sets are filled up in a packed manner, leaving any unused EPDCCH set(s) for PDSCH usage.

Optionally, additional criteria can be considered, e.g. wideband and/or sub-band SINR (Signal to Interference and Noise Ratio) or PMI (Precoding Matrix Indicator), when the EPDCCH set and/or PRB pair is selected.

Looking now to FIG. 6B, the illustrated method is similar to that illustrated by FIG. 6A. Hence only new or modified steps are described here.

In a determine load for EPDCCH set(s) step 49, a load for each EPDCCH set of the configuration group assigned to the wireless device is determined. The load can be determined in the same way as explained above for the determine load step 42.

In an optional conditional EPDCCH set with capacity step 51, at least two EPDCCH sets are analysed. Firstly, it is evaluated whether there is a first EPDCCH set whose resources are currently unassigned to any wireless devices. If this is the case, it is checked whether there is a second EPDCCH set whose resources are assigned to at least one wireless device and the load for the second EPDCCH set is less than a second threshold value. In other words, it is in this step checked if there is a second EPDCCH set with spare capacity. If this is the case, the method proceeds to an assign to EPDCCH set with capacity step 52. Otherwise, the method proceeds to an assign to new EPDCCH set step 54.

In the optional assign to EPDCCH set with capacity step 52, a control message (EPDCCH message) is assigned to the second EPDCCH set to be sent to the wireless device.

In the optional assign to new EPDCCH set step 54, the control message (EPDCCH message) is assigned to the first EPDCCH set to be sent to the wireless device.

In an optional consolidate step 56, wireless device assignments are consolidated when fragmentation has occurred. This is performed when there is spare capacity in one configuration group, by assigning at least part of the resources of the configuration group with spare capacity to at least one wireless device to which resources of another configuration group was previously assigned. In other words, in case the load on the instantiated configuration groups becomes fragmented it might be desirable to move the wireless devices that are configured with a configuration group with low load to other configuration groups. In this way, some configuration groups can be de-instantiated to make space for more PDSCH PRB pairs. This can be done by measuring the configuration group load and in case the load falls below a threshold the wireless device is configured with another configuration group.

Note that when a new configuration group has been recently instantiated, the load in that configuration group will of course be low, so additional conditions like for example age of the configuration group should be considered before consolidating.

Optionally, a congestion handling mechanism could be applied by repeating any of the described methods. In this way, if the wireless devices that are assigned to a configuration group become very active, the load of that configuration group will increase above a threshold, and that will trigger re-configuration of a least one of the wireless devices to other configuration groups. Looking now to FIG. 6C, the illustrated method is similar to that illustrated by FIGS. 6A and 6B. Hence only new or modified steps are described here.

In an optional conditional localized step 57, it is determined whether the EPDCCH set for the wireless device is of a localized type. If this is the case, the method proceeds to a search resources in same order step 58. Otherwise, the method ends (or optionally proceeds to step 49 of FIG. 6B).

In the optional search resources in same order step 58, the resources for each wireless device are searched in the same order for free ECCEs.

In an optional assign control message step 59, a control message is assigned to free ECCEs found in step 58. The control message is a downlink control message to the wireless device.

Discussing now embodiments of all of FIGS. 6A, 6B and 6C, as a result of steps 46 and 48, the assignment of resources for the control channel are transmitted by the radio network node to the wireless device. When the method is performed by the core network node, the core network node then (implicitly or explicitly) instructs the radio network node to send the assignment of resources to the wireless device. Hence, when the control channel is implemented using EPDCCH, the radio network node sends information about which EPDCCH resources in time and frequency (subframes and PRB pair indices) that the wireless device shall monitor for EPDCCH messages. The EPDCCH assignment is done individually for each wireless device that shall use EPDCCH. The EPDCCH resources are set up semi-statically by means of RRC signaling. One or two EPDCCH sets can be set up for each wireless device. The EPDCCH resources are valid for the wireless device until the wireless device obtains a new EPDCCH configuration. The EPDCCH resources are later actively removed by the radio network node by a new RRC message or until the wireless device leaves the cell associated with the radio network node in question.

Later, when a control signal is to be sent to the wireless device, the radio network node assigns an EPDCCH message to one of the search space locations valid for the wireless device for which the EPDCCH is intended. The signal to EPDCCH assignment can be done in each subframe where the wireless device is scheduled with a wireless device specific DL assignment or UL grant. A PRB pair that is configured for EPDCCH but not assigned any EPDCCHs can instead be used for PDSCH. This assignment of a control message is described with reference to steps 52, 54 and 59 above.

Figure 7:
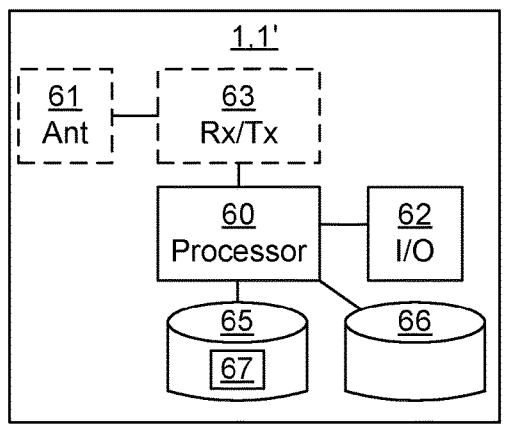
FIG. 7 is a schematic diagram illustrating some components of a network node of FIG. 1.

FIG. 7 is a Schematic Diagram Showing Some Components of any One of the network nodes 1, 1' of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 6A-B above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 63 can be any combination of read and write memory (RAM) and read only memory (ROM).

The network node 1, 1' further comprises an I/O interface 62 for communicating with other external entities. Optionally, the I/O interface 62 also includes a user interface.

Optionally, e.g. when the network node is implemented as a radio network node, the network node also comprises one or more transceivers 63, comprising analogue and digital components, and a suitable number of antennas 61 for wireless communication with wireless devices.

Other components of the network node 1, 1' are omitted in order not to obscure the concepts presented herein.

Figure 8:
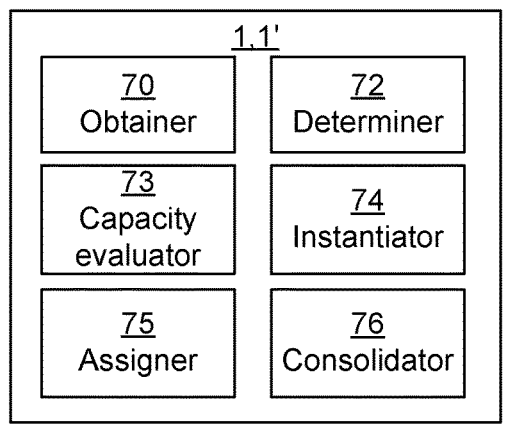
FIG. 8 is a schematic diagram showing functional modules of a network node of FIGS. 1 and 6.

FIG. 8 is a schematic diagram showing functional modules of any one of the network nodes 1, 1' of FIG. 1, providing capability of performing an embodiment of the methods illustrated in FIGS. 6A-B. The modules can be implemented using software instructions such as a computer program executing in the network node 1, 1' and/or using hardware, such as application specific integrated circuits, field programmable gate arrays, discrete logical components, etc. The modules correspond to the steps in the method illustrated in FIGS. 6A-B.

An obtainer is configured to perform step 40. A determiner 72 is configured to perform steps 42 and 49. A capacity evaluator 73 is configured to perform steps 43 and 51. An instantiator 74 is configured to perform step 44. An assigner 75 is configured to perform steps 46, 48, 52 and 54. A consolidator 76 is configured to perform step 56.

Figure 9:
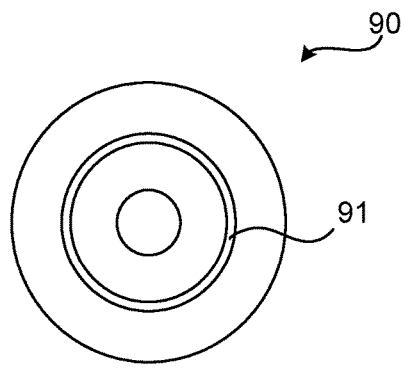
FIG. 9 shows one example of a computer program product comprising computer readable means.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assigning resources for control signalling for a wireless device, wherein the resources can be used for user data when not used for control signalling, the method being performed in a network node and comprising the steps of:
    obtaining a collection of at least one configuration group, wherein each configuration group refers to a selection of the resources;
    determining a load for each one of the configuration groups;
    when no configuration group of the collection has a load which is less than a first threshold value, instantiating a new configuration group referring to a selection of the resources, and assigning at least part of the resources of the new configuration group to the wireless device; and
    when there is a first configuration group in the collection having a load which is less than the first threshold value, assigning at least part of the resources of the first configuration group to the wireless device.

2. The method according to claim 1, wherein each resource is a pair of physical resource blocks, PRBs.

3. The method according to claim 1, wherein each configuration group comprises at least one Enhanced Physical Downlink Control Channel, EPDCCH, set, wherein each EPDCCH set comprises at least two resources.

4. The method according to claim 3, further comprising the steps of:
    determining a load for each EPDCCH set of the configuration group assigned to the wireless device; and
    when there is a first EPDCCH set whose resources are currently unassigned to any wireless devices and a second EPDCCH set whose resources are assigned to at least one wireless device and the load for the second EPDCCH set is less than a second threshold value, assigning a control message in the second EPDCCH set to be sent to the wireless device.

5. The method according to claim 4, further comprising the step of:
    when there is a first EPDCCH set whose resources are currently unassigned to any wireless devices and a second EPDCCH set whose resources are assigned to at least one wireless device and the load for the second EPDCCH set is greater than a second threshold value, assigning a control message in the first EPDCCH set to be sent to the wireless device.

6. The network node according to claim 5, further comprising instructions that, when executed by the processor, cause the network node to:
    when there is spare capacity in one configuration group, consolidate wireless device assignments by assigning at least part of the resources of the configuration group with spare capacity to at least one wireless device to which resources of another configuration group was previously assigned.

7. The method according to claim 3, wherein there is at least one EPDCCH set which is assigned to two configuration groups.

8. The method according to claim 3, further comprising the steps of:
    when the EPDCCH set is of a localized type, searching the resources for each wireless device in the same order for free Enhanced Control Channel Elements, ECCEs; and
    assigning a control message to free ECCEs.

9. The method according to claim 1, further comprising the step of:
    when there is spare capacity in one configuration group, consolidating wireless device assignments by assigning at least part of the resources of the configuration group with spare capacity to at least one wireless device to which resources of another configuration group was previously assigned.

10. A network node for assigning resources for control signalling for a wireless device, wherein the resources can be used for user data when not used for control signalling, the network node comprising: a processor; and a memory storing instructions that, when executed by the processor, cause the network node to:
obtain a collection of at least one configuration group, wherein each configuration group refers to a selection of the resources;
determine a load for each one of the configuration groups;
when no configuration group of the collection has a load which is less than a first threshold value, instantiate a new configuration group referring to a selection of the resources, and assign at least part of the resources of the new configuration group to the wireless device; and
when there is a first configuration group in the collection having a load which is less than the first threshold value, assign at least part of the resources of the first configuration group to the wireless device.

11. The network node according to claim 10, wherein each resource is a pair of physical resource blocks, PRBs.

12. The network node according to claim 10, wherein each configuration group comprises at least one Enhanced Physical Downlink Control Channel, EPDCCH, set, wherein each EPDCCH set comprises at least two resources.

13. The network node according to claim 12, further comprising instructions that, when executed by the processor, cause the network node to:
determine a load for each EPDCCH set of the configuration group assigned to the wireless device; and
when there is a first EPDCCH set whose resources are currently unassigned to any wireless devices and a second EPDCCH whose resources are assigned to at least one wireless device and the load for the second EPDCCH set is less than a second threshold value, assign a control message in the second EPDCCH set to be sent to the wireless device.

14. The network node according to claim 13, further comprising instructions that, when executed by the processor, cause the network node to:
when there is a first EPDCCH set whose resources are currently unassigned to any wireless devices and a second EPDCCH set whose resources are assigned to at least one wireless device and the load for the second EPDCCH set is greater than a second threshold value, assign a control message in the first EPDCCH set to be sent to the wireless device.

15. The network node according to claim 12, wherein there is at least one EPDCCH set which is assigned to two configuration groups.

16. The network node according to claim 12, further comprising instructions that, when executed by the processor, cause the network node to, when the EPDCCH set is of a localized type, search the resources for each wireless device in the same order for free Enhanced Control Channel Elements, ECCEs; and assign a control message to free ECCEs.

17. A network node comprising:
means for obtaining a collection of at least one configuration group, wherein each configuration group refers to a selection of resources for control signalling for a wireless device, wherein the resources can be used for user data when not used for control signalling;
means for determining a load for each one of the configuration groups;
means for instantiating a new configuration group referring to a selection of the resources when no configuration group of the collection has a load which is less than a first threshold value;
means for assigning at least part of the resources of the new configuration group to the wireless device when no configuration group of the collection has a load which is less than a first threshold value; and
means for assigning at least part of the resources of the first configuration group to the wireless device when there is a first configuration group in the collection having a load which is less than the first threshold value.

18. A computer program for assigning resources for control signalling for a wireless device, wherein the resources can be used for user data when not used for control signalling, the computer program comprising computer program code which, when run on a network node causes the network node to:
obtain a collection of at least one configuration group, wherein each configuration group refers to a selection of the resources;
determine a load for each one of the configuration groups;
when no configuration group of the collection has a load which is less than a first threshold value, instantiate a new configuration group referring to a selection of the resources, and assign at least part of the resources of the new configuration group to the wireless device; and
when there is a first configuration group in the collection having a load which is less than the first threshold value, assign at least part of the resources of the first configuration group to the wireless device.

* * * * *